United States Patent Office 2,841,591
Patented July 1, 1958

2,841,591

PREPARATION OF PHTHALIMIDINES

William W. Prichard, Wilmington, Del., assignor to E. I. du Pont de Nemours and Company, Wilmington, Del., a corporation of Delaware No Drawing. Application June 18, 1952
Serial No. 294,255

7 Claims. (Cl. 260—325)

This invention relates to the preparation of phthalimidines and, more particularly, to a new process for the preparation of N-substituted phthalimidines from readily available starting materials.

The N-substituted phthalimidines, that is, the compounds represented by the general formula

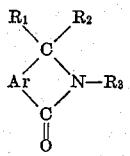

where Ar is a carbocyclic aromatic nucleus, $R_1$ and $R_2$ are hydrogen or substituents, and $R_3$ is a substituent, are valuable intermediates in organic synthesis, in particular in the synthesis of dyes or pigments of the porphyrin type. However, their study has been retarded by the lack of a satisfactory and economical method of preparing them. Although several synthetic routes to the phthalimidines are known, they all require relatively inaccessible starting materials.

An object of the present invention is to provide a new and improved process for preparing N-substituted phthalimidines. A further object is to provide such a process wherein said compounds can be prepared in high yield from readily available starting materials. Further objects will be apparent from the description of the invention given hereinafter.

The above objects are accomplished according to the present invention by reacting an N-substituted imine of a carbocyclic aromatic ketaldone having the carbonyl group attached to annular carbon of an aromatic nucleus, which carbon is in the ortho position relative to an unsubstituted annular carbon, with carbon monoxide at a pressure above about 10 atmospheres and at a temperature above about 200° C., in the presence of catalytic amounts of cobalt carbonyl or nickel carbonyl.

In a more specific form, the process of this invention comprises reacting, preferably in an inert organic solvent, an aromatic ketaldimine of the formula

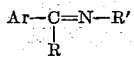

where Ar is a carbocyclic aromatic nucleus attached to the ketaldimino group through an annular carbon which is ortho to an unsubstituted annular carbon, R is hydrogen or an aliphatic or aromatic substituent and R' is an aliphatic or aromatic substituent, with carbon monoxide at a pressure in the range of 100–1000 atmospheres and at a temperature in the range of 225° C.–450° C., in the presence of catalytic amounts of cobalt carbonyl or nickel carbonyl.

In a still more specific aspect, the process comprises reacting in an inert organic solvent an aromatic ketaldimine of the above formula and where the groups Ar, R and R' are free from substituents which evolve gas in the Zerewitinoff test for active hydrogen, with carbon monoxide at a pressure in the range of 100–500 atmospheres and at a temperature in the range of 225°–375° C., in the presence of catalytic amounts of cobalt carbonyl.

The reaction is represented by the following equation, in which the aromatic nucleus of the illustrative reactant is phenyl for the sake of simplicity:

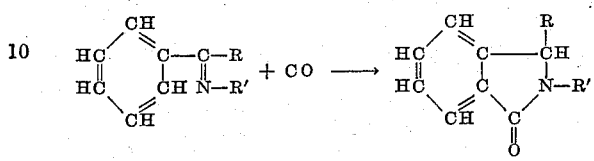

It will be seen that the annular carbon ortho to the annular carbon bearing the ketaldimino group must be unsubstituted for cyclization to take place.

The term "ketaldone" is used here in its accepted sense (see, for example, U. S. Patent 2,085,750) to denote an aldehyde or a ketone. The term "ketaldimine" in turn denotes the imines (also called Schiff's bases) obtained by reacting an aldehyde or ketone with ammonia or a primary amine. These imines are readily obtainable by known methods. The ketaldimines suitable for use as starting materials in the process of this invention are the products obtained by reacting a primary monoamine or diamine with an aromatic aldehyde or ketone.

It is preferred to use the preformed ketaldimine, but it is also possible to form it in situ by using as the reactant a mixture in suitable proportions of an aromatic ketaldone and a primary amine.

The reaction proceeds slowly at temperatures below about 200° C., and it is therefore preferred to operate above this temperature. The temperature can be as high as the decomposition point of the reactants, but in practice it need not be higher than about 450° C., a generally useful range being 225–375° C.

In view of the relatively high temperature necessary for the reaction to take place, it is conveniently carried out in pressure vessels in a carbon monoxide atmosphere. An added pressure of carbon monoxide is desirably used. This pressure is not critical, provided there is sufficient carbon monoxide present to react with the aromatic ketaldimine and preferably an excess thereover. There can be used, for example, a carbon monoxide pressure between 10 and 1000 atmospheres at the operating temperature, a preferred range being 100–500 atmospheres at the reaction temperature.

Cobalt carbonyl and nickel carbonyl are specific catalysts for this reaction. The catalyst is preferably introduced in the reaction mixture as the preformed metal carbonyl, but it can be formed in situ from carbon monoxide and the metallic element. The metal carbonyl need be used only in small amounts, e. g., in amounts between 0.1% and 10%, and preferably between 0.5% and 2%, of metal based on the weight of the aromatic ketaldimine, although much more can be used if desired, e. g., up to 25% by weight. Better conversions are in general obtained with cobalt carbonyl, and this catalyst is therefore preferred to nickel carbonyl.

A solvent or diluent medium is not essential, but it is helpful to promote better contact between reactants and catalyst. Any inert organic solvent stable under the reaction conditions can be used, the preferred ones being the saturated aliphatic or alicyclic hydrocarbons such as n-hexane, kerosene, cyclohexane, and the like, and particularly the aromatic hydrocarbons such as benzene, toluene, the xylenes, naphthalene and the like. The amount of solvent in relation to reactants and catalyst is largely immaterial as long as there is sufficient solvent to provide good contact. For practical and economical reasons, there is usually employed from 1 to 20 parts of solvent or diluent per part of aromatic N-substituted ketaldimine.

The reaction system can tolerate the presence of low amounts of water, such as the amount which forms when the ketaldimine is formed in situ from the reactants. However, the amount of water present should preferably not exceed about 5% of the total weight of reactants and solvent. Preferably, the reaction system is substantially anhydrous.

At the preferred temperature the reaction is quite rapid. It is probably substantially completed in a few minutes, but the heating period may be continued for several hours if desired. The reaction product may be isolated by any desired method. Since phthalimidines are well-crystallized solids, it is in general sufficient to evaporate the solvent partly or completely and filter off the solid phthalimidine, which may be recrystallized from an appropriate solvent if desired.

The following examples, in which parts are by weight unless otherwise stated, illustrate specific embodiments of the invention.

*Example I*

A silver-lined pressure vessel with a volume equal to that of 400 parts of water was charged with 20 parts of N-benzylideneaniline, $C_6H_5$—CH=N—$C_6H_5$, 100 parts of benzene, and 1.0 part of cobalt carbonyl. The vessel was sealed and pressured to 200 atmospheres with carbon monoxide. The vessel was then heated to 325° C. for one hour with agitation, cooled, and opened. The recovered material, 111.5 parts, was filtered. The solid reaction product, 17.5 parts, melted at 163–164° C. and was identified as 2-phenylphthalimidine

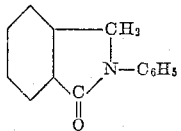

by a mixed melting point with an authentic sample (M. P. 165–166° C.). An additional 1.7 parts of this material was recovered by concentrating the filtrate for a total conversion of 82.6%.

*Example II*

A vessel as described in Example I was charged with 25 parts of N-p-methoxybenzylideneaniline, 100 parts of benzene and 0.5 part of cobalt carbonyl and pressured to 200 atmospheres with carbon monoxide. After heating, with agitation, for one hour at 325° C., the contents (116 parts) were discharged. The benzene was evaporated from the product, leaving 24.5 parts of crystalline solid which melted at 183° C. after one crystallization from a mixture of chloroform and methanol. The product was 6-methoxy-2-phenylphthalimidine

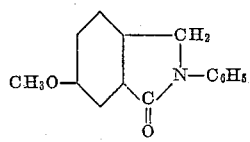

*Example III*

Twenty parts of N-p-chlorobenzylideneaniline were reacted with carbon monoxide by the procedure described in Example I. The product, 115.0 parts, was distilled. After removal of 82.4 parts of benzene, 10.0 parts of crystalline material was flash-distilled from a bath heated to 250–300° C. at 1 mm. pressure. The still residue, 15.2 parts, was black and tarry. The crystalline distillate, after recrystallization from a mixture of chloroform and methanol, melted at 213–216° C. It was identified as 6-chloro-2-phenylphthalimidine

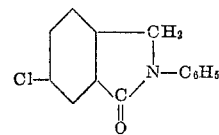

*Analysis.*—Calc. for $C_{14}H_{10}NOCl$: C, 69.0; H, 4.1; N, 5.76; Cl, 14.58. Found: C, 68.0; H, 4.57; N, 5.51; Cl, 14.50.

*Example IV*

A charge of 30 parts of N-benzylidenemethylamine, $C_6H_5$—CH=N—$CH_3$, 100 parts of benzene and 0.5 part of cobalt carbonyl was pressured with 200 atmospheres of carbon monoxide and heated at 325° C. for one hour with agitation. The product, 126.5 parts, was heated to remove 92.5 parts of benzene. The remainder was flash-distilled from a bath heated to 250° C. under 1 mm. pressure. This gave 29.3 parts of crystalline solid in the volatile fraction and 1 part of non-volatile residue. The solid distillate was identified as 2-methylphthalimidine, obtained in 79% conversion, by its melting point of 114–116° C.

*Example V*

A charge of 20 parts of N-(1-methylbenzylidene) aniline

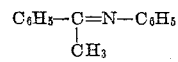

100 parts of benzene and 0.5 part of cobalt carbonyl was pressured with 200 atmospheres of carbon monoxide and heated to 325° C. for one hour with agitation. The reaction product (115.8 parts) was heated to remove the benzene, and the residual material was flash-distilled from a bath at 250° C. at 1 mm. pressure. This gave 20.6 parts of viscous oil which gradually crystallized. After recrystallization from a mixture of ether and petroleum ether, it melted at 81–81.5° C. This product was identified as 2-phenyl-3-methylphthalimidine

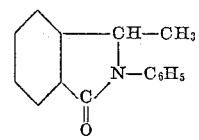

obtained in 90% conversion.

*Analysis.*—Calc. for $C_{15}H_{13}ON$: C, 80.8; H, 5.83; N, 6.28. Found: C, 80.79; H, 5.88; N, 6.66.

*Example VI*

Using the procedure of Example V, but with N-(1-phenylbenzylidene)aniline

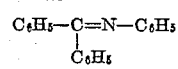

as the reactant, 2,3-diphenylphthalimidine, M. P. 196–196.5° C., was obtained in 86% conversion.

*Example VII*

A mixture of 25 parts of N-(p-dimethylamino)benzylideneaniline, 100 parts of benzene and 0.5 part of cobalt carbonyl was reacted with carbon monoxide as in Example I. The product (119.7 parts) was filtered to isolate 14 parts of 2-phenyl-6-dimethylaminophthalimidine.

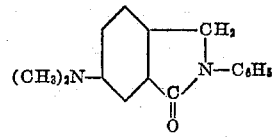

which was identified by its melting point, 142–148° C. after two recrystallizations from methanol, and by its hydrochloride, M. P. 193–196° C. The filtrate gave on evaporation 13.4 parts of a viscous oil, which was a less pure product.

*Example VIII*

A charge of 20 parts of N-benzylideneaniline, 100 parts of benzene, and 5 parts of nickel carbonyl was pressured with 200 atmospheres of carbon monoxide and heated to 325° C. for one hour with agitation. The product was flash-distilled. After removal of the benzene, 13.4 parts of N-benzylideneaniline was recovered by heating at 140° C. under 1 mm. pressure. The temperature of the heating bath was then raised to 250° C. and 4.2 parts of a solid distilled over. This was identified as 2-phenylphthalimidine, obtained in 18% conversion and 55% yield, based on the unrecovered starting material.

*Example IX*

This example shows the preparation of a bis-phthalimidine from a bis-aromatic ketaldimine, according to the following reaction:

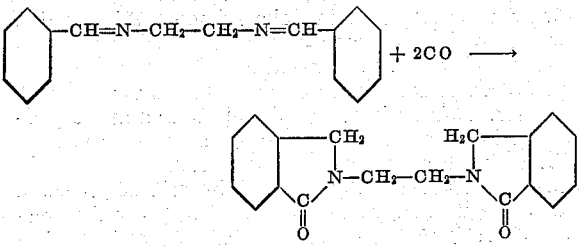

A charge of 20 parts of N,N'-dibenzylidene-ethylenediamine, 100 parts of benzene and 0.5 part of cobalt carbonyl was pressured with 200 atmospheres of carbon monoxide and heated to 325° C. for one hour with agitation. The product (113.5 parts) was heated to remove the benzene, then flash-distilled under 1 mm. pressure from a bath heated at 250–300° C. There was obtained 12 parts of solid distillate which, after recrystallization from a mixture of ethanol and diethyl ether, melted at 235.5–237° C. The melting point reported in the literature for N,N'-ethylene bis-phthalimidine is 227.5–229° C. and other properties, such as solubility, reported for this compound are also in agreement.

*Example X*

A mixture of 34 parts of N-benzylidene-1-naphthylamine, 22 parts of benzene and 1.5 parts of cobalt carbonyl was pressured to 200 atmospheres with carbon monoxide, then heated at 325° C. with agitation for one hour. The reaction product was concentrated to one-third of its volume and filtered, giving 20 parts of a light brown solid. This was 2-(1-naphthyl)phthalimidine

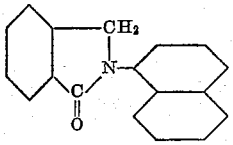

obtained in 55% yield. After recrystallization from a mixture of chloroform and methanol, it melted at 191–193° C.

*Analysis.*—Calc'd for $C_{18}H_{13}ON$: C, 83.4; H, 5.05; N, 5.4. Found: C, 82.79; H, 5.04; N, 5.35.

*Example XI*

A mixture of 25 parts of N-benzylidene(p-diethylamino)aniline, 90 parts of benzene and 2 parts of cobalt carbonyl was pressured to 200 atmospheres with carbon monoxide and heated at 300° C. with agitation for two hours. Filtration of the reaction product gave a brown solid which, after recrystallization from a chloroform-methanol mixture in the presence of decolorizing carbon, was a well crystallized colorless solid melting at 180–182° C. This was 2-(p-diethylamino)phenylphthalimidine

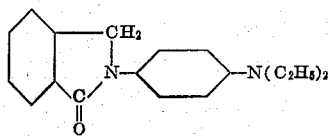

further identified analytically and by its solubility in dilute hydrochloric acid, from which it was precipitated by addition of sodium hydroxide.

It will be understood that the above examples are merely illustrative and that the present invention broadly comprises the preparation of N-substituted phthalimidines by reacting an N-substituted imine of an aromatic ketaldone having the carbonyl groups attached to annular carbon of an aromatic nucleus, which carbon is in the ortho position relative to an unsubstituted annular carbon, with carbon monoxide at a pressure above about 10 atmospheres and at a temperature above about 200° C., in the presence of catalytic amounts of cobalt carbonyl or nickel carbonyl.

The process of this invention is generically applicable to the preparation of phthalimidines from N-substituted imines of carbocyclic aromatic aldehydes and ketones where the carbonyl group is directly attached to annular carbon, itself in ortho position relative to an unsubstituted annular carbon. More specifically, the starting materials are represented by the general formula

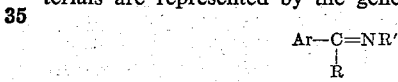

where Ar is a carbocyclic aromatic nucleus having a free, i. e., unsubstituted, annular carbon ortho to the annular carbon bearing the ketaldimine group, R is hydrogen or an aliphatic or aromatic radical, and R' is an aliphatic or aromatic radical. Obviously, it is undesirable to use starting materials containing functional groups reactive with carbon monoxide under the reaction conditions, since side reactions would seriously decrease the yield of desired product in such instances. In general, these undesirable functional groups are those which evolve gas in the well-known Zerewitinoff test for active hydrogen, such as the nitro, amino, hydroxy, mercapto groups and the like.

The process of this invention is applicable, for example, to the treatment of N-substituted aromatic ketaldimines in which the carbocyclic aromatic radicals are aryl groups of one to three six-membered nuclei, e. g., phenyl, naphthyl, anthryl or phenanthryl, including such aryl groups bearing substituents such as alkyl, aryl, alkoxy, aryloxy, dialkylamino, carbalkoxy, halo, cyano groups and the like.

The substituent or substituents present in the ketaldimino group are preferably hydrocarbon radicals of 1 to 12 carbon atoms, inclusive, and still more preferably aliphatically saturated hydrocarbon radicals of 1 to 12 carbon atoms, e. g., alkyl, cycloalkyl, aryl and aralkyl radicals of 1 to 12 carbon atoms, or such radicals bearing inert functional groups such as alkoxy, aryloxy, dialkylamino, carbalkoxy, halo and cyano groups. Thus, the ketaldimino carbon and the ketaldimino nitrogen substituents can be methyl, ethyl, propyl, butyl, isobutyl, n-hexyl, n-dodecyl, allyl, butenyl, cyclopentyl, cyclohexyl, phenyl, tolyl, butylphenyl, naphthyl, benzyl, phenethyl, methoxyethyl, phenoxyethyl, dimethylaminoethyl, carbomethoxyphenyl, chloronaphthyl, cyanophenyl groups and the like. As illustrated in Example IX, the ketaldimino nitrogen subsituent can be a divalent hydrocarbon radical, preferably a methylene chain of 1 to 6 carbon atoms, inclusive, whose other valence is bound to a second aromatic ketaldimino group similar to the first one, in which case the resulting product is a bis-phthalimidine in which the two phthalimidine nuclei are present at each end of a divalent hydrocarbon radical.

The best results are obtained with those aromatic ketaldimines in which the aromatic group is an aryl group of one to two six-membered nuclei, or such groups bearing one substituent, which can be an aliphatically saturated hydrocarbon group of 1 to 6 carbon atoms, inclusive, an alkoxy or aryloxy group of 1 to 6 carbon atoms, inclusive, halogen or a dialkylamino group of 2 to 4 carbon atoms, inclusive; the ketaldimino nitrogen is substituted by an aryl or saturated aliphatic hydrocarbon group of 1 to 6 carbon atoms, inclusive; and the ketaldimino carbon bears hydrogen or an aryl or saturated aliphatic hydrocarbon group of 1 to 6 carbon atoms, inclusive.

Additional specific examples of suitable starting materials are N-benzylidene 3-biphenylamine, N-benzylidene phenylethylamine, N-benzylidene cyclohexylamine, N-(1-ethylbenzylidene)ethylamine, N-(1-phenylbenzylidene) n-dodecylamine, N-(1-benzylbenzylidene)allylamine, 1-(1-naphthyl)-1-naphthyliden methylamine, N-(o-tolylidene) propylamine, N-(1-methyl p-phenylbenzylidene)methylamine, N-p-phenoxybenzylideneaniline, N-(o-diethylaminobenzylidene)ethylamine, N - p-carbomethoxybenzylidene methylamine, N-(1-phenyl p-bromobenzylidene)n-butylamine, N-p-cyanobenzylideneaniline, N - benzylidene(2-methoxyethylamine), N - benzylidene(2 - phenoxyethylamine), N-benzylidene (2-dimethylaminoethylamine), N-benzylidene(p-carbomethoxyaniline), N-benzylidene(4-chloro-1-naphthylamine), N-benzylidene(p-cyanoaniline), N,N'-dibenzylidenehexamethylenediamine and the like.

This invention provides a simple and effective method of preparing a large variety of phthalimidines. The yields are in general very good and often excellent, and the products can be readily isolated without expensive purification steps. The phthalimidines are technically important as intermediates in chemical synthesis, particularly in the fields of dyes and organic pigments.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing an N-substituted phthalimidine which comprises reacting an aromatic ketaldimine of the formula

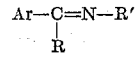

wherein Ar is a carbocyclic aromatic nucleus attached to the ketaldimino group through an annular carbon in the ortho position relative to an unsubstituted annular carbon, R is from the group consisting of hydrogen and aliphatic and aromatic substituents, and R' is from the group consisting of aromatic and aliphatically saturated hydrocarbon, oxahydrocarbon and azahydrocarbon substituents, said ketaldimine being free of substituents which evolve gas in the Zerewitinoff test for active hydrogen, with carbon monoxide at a pressure of 100–1000 atmospheres and a temperature of 225° C.–450° C., in the presence of at least 0.1% by weight of said ketaldimine, of a catalyst from the group consisting of cobalt carbonyl and nickel carbonyl calculated as metal.

2. Process as set forth in claim 1 wherein said reaction is carried out in an inert organic solvent in the presence of catalytic amounts of cobalt carbonyl.

3. Process as set forth in claim 1 wherein said reaction is carried out under a carbon monoxide pressure of 100–500 atmospheres and a temperature of 225° C.–375° C.

4. Process as set forth in claim 1 wherein said reaction is carried out in an inert organic solvent and in the presence of 0.1%–10%, by weight of said aromatic ketaldimine, of said carbonyl calculated as metal.

5. Process as set forth in claim 3 wherein said reaction is carried out in an inert organic solvent and in the presence of 0.1%–10%, by weight of said aromatic ketaldimine, of said carbonyl calculated as metal.

6. Process as set forth in claim 3 wherein said reaction is carried out in an inert organic solvent and in the presence of 0.5%–2%, by weight of said aromatic ketaldimine, of cobalt carbonyl calculated as metal.

7. Process of preparing 2-phenylphthalimidine which comprises reacting in benzene N-benzylideneaniline with carbon monoxide under carbon monoxide pressure of 100–500 atmospheres and a temperature of 225° C.–375° C. in the presence of 0.5%–2%, by weight of said N-benzylideneaniline, of cobalt carbonyl calculated as metal.

References Cited in the file of this patent

Oxo Process, patent applications of I. G., F. A., vol. II, edited by Charles A. Meyr and Co., Nyack, N. Y., pp. 7–9, 12 and 13.